United States Patent
Lu et al.

(10) Patent No.: US 8,386,647 B2
(45) Date of Patent: Feb. 26, 2013

(54) METHOD FOR TIME SOURCE CALIBRATION AND SYSTEM THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 519 days.

(21) Appl. No.: 12/504,067

(22) Filed: Jul. 16, 2009

(65) Prior Publication Data
US 2010/0049875 A1 Feb. 25, 2010

(30) Foreign Application Priority Data

Aug. 19, 2008 (CN) .......................... 2008 1 0118706

(51) Int. Cl.
*G06F 15/16* (2006.01)
*H04L 9/00* (2006.01)
(52) U.S. Cl. ........................... 709/248; 709/203; 380/30
(58) Field of Classification Search .................. 709/203, 709/248; 380/30
See application file for complete search history.

(56) References Cited

U.S. PATENT DOCUMENTS

| | | | | |
|---|---|---|---|---|
| 5,444,780 A | * | 8/1995 | Hartman, Jr. | 380/30 |
| 6,823,456 B1 | * | 11/2004 | Dan et al. | 713/178 |
| 7,042,958 B2 | | 5/2006 | Biedka et al. | |
| 2011/0113122 A1 | * | 5/2011 | Drope | 709/219 |

* cited by examiner

*Primary Examiner* — Asghar Bilgrami
(74) *Attorney, Agent, or Firm* — Hammer & Associates, P.C.

(57) ABSTRACT

A method for time source calibration, wherein the method comprises steps of sending a requirement for obtaining time by a client side computer to a server side; sending a first data packet including time and generated verification information by the server side to a key device via the client side computer; said time is the current time of the server side; calibrating time of key device with the obtained as benchmark time and counting time normally by the key device; sending a second data packet including calibrated current time of the key device and the verification information by the key device to the server side via the client side computer; and obtaining the current time of the key device in the second data packet by the key device after the verification information in the second data packet is verified to be valid by the key device. According to the present invention, the reliable time source is obtained, which secures the security of the trade.

7 Claims, 2 Drawing Sheets

METHOD FOR TIME SOURCE CALIBRATION AND SYSTEM THEREOF

This application claims priority to the Chinese patent application, entitled "METHOD FOR TIME SOURCE CALIBRATION AND SYSTEM THEREOF" and filed with the Chinese Patent Office on Aug. 19, 2008, which is hereby incorporated by reference in its entirety.

FIELD OF THE INVENTION

The present invention relates to a method for time source calibration and a system thereof, and more particularly, to a method of time source calibration and a system thereof for trade security.

BACKGROUND OF THE INVENTION

In the prior art, identity authentication technology is used generally for guaranteeing the security of online trade. The nature of the identity authentication means that information (including confidential information or information of special hardware held by a person or unique biological feature of the person) owned by a peer cannot be counterfeited by any third party (except the authentication authority which is required in some solutions). And if the peer makes the authenticator believe that he has the information (by showing the information to authenticator or using method of zero-knowledge proof), the identity of the peer is authenticated. In order to prevent the information from being obtained or tampered illegally in process of transferring, technology of encryption/decryption is adapted generally. Encryption technology is a usual way for security and keeping secret by means of converting important data into unrecognizable code and then transferring the code. Only the corresponding key is input can the content of the important data be readable. Decryption is a reverse process of the encryption. Decryption technology is adapted to convert the obtained code information into its original data in the same or different way of encryption.

To prevent the information from being destroyed and secure the authenticity of the traders of both sides as well, signature technology is used. The signature technology includes digital signature and electronic signature. Digital signature means that signing a signature with electric codes formed by a series of symbols and codes generated by some cryptography algorithm instead of a handwriting signature or a stamp. As a mature technology with strong operability, digital signature is a general electric signature method used in e-business or e-office. Digital signature adopts a normalized process and a scientific method to authenticate the identity of a signatory and approve the electrical data content of an item. With the same function of the handwriting signature or the stamp, electric signature is a means that can identify the authenticity of traders of both sides in the electric files and guarantee security and reality and non-repudiation of the trade.

But for some trades with strictly time limit such as real-time stock trade, the time of local equipment, also called time source, might be unreliable because of technical or commercial reasons. The security of trade cannot be guaranteed by depending on identity authentication, encryption/decryption or signature only. So the time source which the trade is relied on is very important. Time source is the source where time comes from, especially the reliable time comes from. There are two sources for obtaining time, one is from the time of a server side, and the other is from the local time of a client side computer. But the local time of the client computer is unreliable, and the time of the server side cannot be obtained at any moment or anywhere. So the time source of the client computer should be calibrated according to the server side.

SUMMARY OF THE INVENTION

In order to solve the problems described above, the invention provides a method for time source calibration and a system thereof.

The solution provided by the invention includes a method for time source calibration, wherein sending a requirement for obtaining time by a client side computer to a server side;

sending a first data packet including current time of the server side and verification information generated by the server side to a key device via the client side computer;

calibrating the time of the key device with the obtained current time of the server side as benchmark time and counting time normally by the key device;

sending a second data packet including calibrated current time of the key device and the verification information by the key device to the server side via the client side computer; and obtaining the current time of the key device in the second data packet by the key device after the verification information in the second data packet is verified to be valid by the key device.

The step that the verification information in the second data packet is verified to be valid by the key device includes that the verification information is valid when the verification information in the second data packet accords with the verification information generated by the server side and is received for the first time.

Before sending a requirement for obtaining time by the client side computer to the server side, a step of authenticating identity of a user by the key device may be included.

After sending a requirement for obtaining time by the client side computer to the server side, a step of exchanging public keys between the server side and the client side computer may be included.

The verification information includes a random number generated by the server side.

The first data packet and the second data packet can be sent as cipher text, the first data packet is encrypted with the public key of the key device; and the second data packet is encrypted with the public key of the server side.

The authenticating identity includes one or some of following methods:

1) verifying whether the PIN code entered by the user is legitimate;
2) verifying whether the biological features of the user is legitimate;
3) verifying whether the key device provided by the user contains legitimate data;
4) verifying whether the key device provided by the user contains legitimate hardware serial number; and
5) sending data to the key device for operation and verifying whether the operation result is legitimate.

A system of time source calibration wherein the system includes a server side, a client side computer and a key device; the server side includes a first time obtaining module adapted to obtain current time of the server side;

a first communication module adapted to send the first data packet including the current time to the client side computer and receive the second data packet from the client side computer;

a second time obtaining module adapted to obtain the time of the key device from the second data packet;

a verification information generating module adapted to generate verification information, and the verification information is in the first data packet; and a verification information determining module adapted to determine the validity of the verification information returned by the second data packet;

the client side computer includes a second communication module adapted to implement data communication between the client side computer and the server side;

a third communication module adapted to implement data communication between the client side computer and the key device; and an input module adapted to enter identity verification information by a user and send requirement of obtaining time to the server side;

the key device includes a fourth communication module adapted to receive the first data packet forwarded by the client side computer and send the second data packet including the calibrated current time of the key device to the client side computer;

a clock module adapted to generate current time and time counting by the key device; and a clock calibrating module adapted to calibrate the time of the clock module in the key device according to the time in the first data packet.

The key device further includes an identity authenticating module adapted to permit the fourth communication module to receive the first data packet after the identity verification information is authenticated.

The server side further includes a first encryption/decryption module adapted to encrypt the first data packet sent from the first communication module or decrypt the second data packet received by the first communication module.

The key device further includes a second encryption/decryption module adapted to decrypt the first data packet received by the fourth communication module or encrypt the second data packet sent from the fourth communication module.

The first communication module and the second communication module can be a telephone line interface, an Ethernet interface, or optical fiber.

The third communication module and the fourth communication module can be a USB interface, an eSATA interface, a SDIO interface, a PCMCIA interface, an infrared signal communication unit, a Bluetooth signal communication unit, a wireless USB signal communication unit, a contactless smart card communication unit, an optical signal communication unit, or a RF signal communication unit.

From what described above, in the present invention, the server side sends the current time of the server side to the key device via the client side computer to calibrate the time of the key device, and the time after the key device counts time normally is deemed as time source of trade, so the reliable time source is obtained, which secures the security of the trade.

DETAILED DESCRIPTION OF THE INVENTION

Embodiment 1

Figure 1:
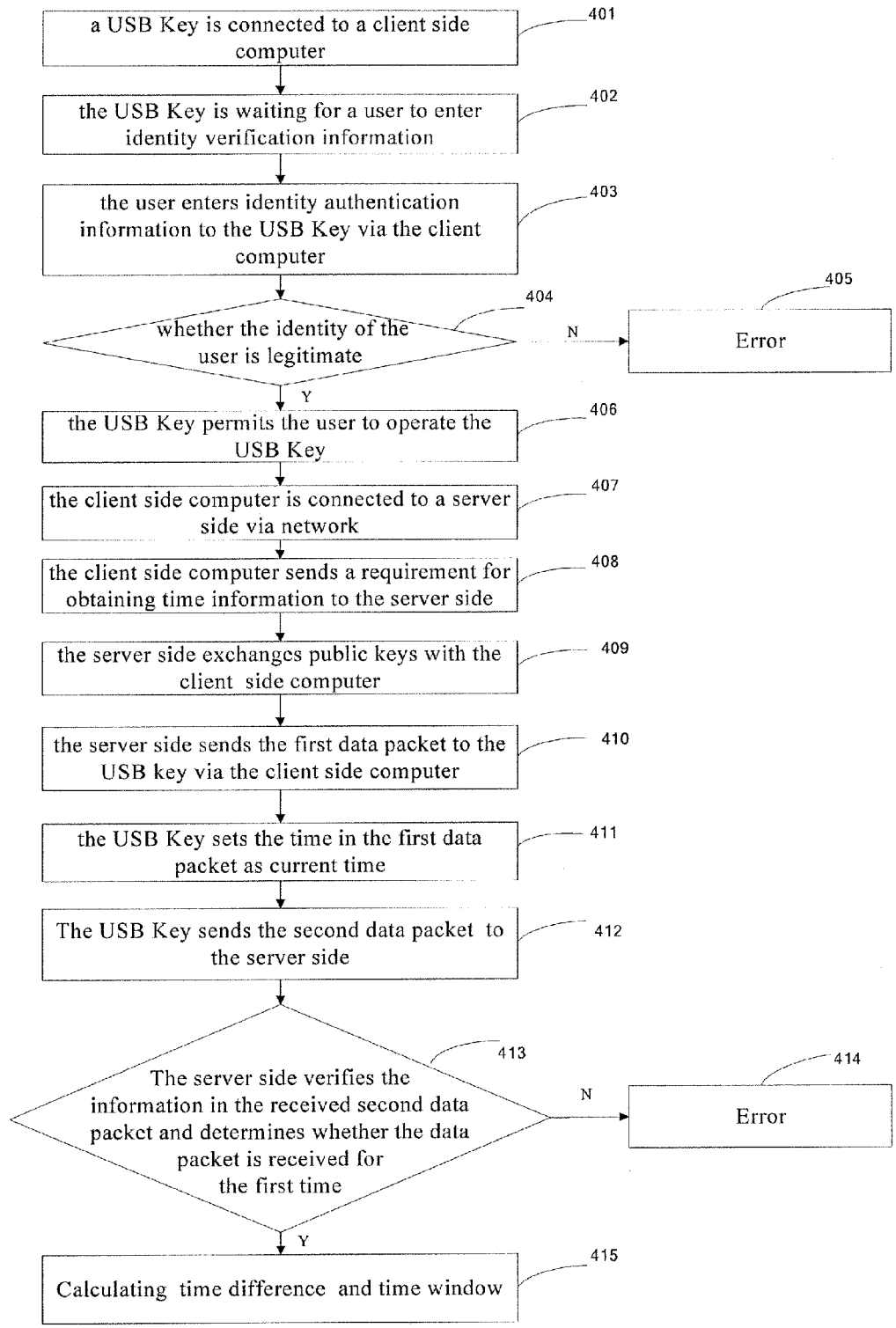
FIG. 1 is a flow chart illustrating a method for time source calibration according to the first embodiment of the invention.

Referring to FIG. 1, the present invention provides a preferable embodiment. The embodiment is described in details below combined with FIG. 1.

Step 401, a USB Key is connected to a client side computer;

Step 402, the USB Key is waiting for a user to enter identity verification information;

Step 403, the user enters identity authentication information to the USB Key via the client side computer;

Step 404, the USB Key internally verifies whether the identity of the user is legitimate, if so, go to step 406; otherwise go to step 405;

Step 405, the USB Key prompts error via the client side computer;

Step 406, the USB Key permits the user to operate the USB Key;

Step 407, the client side computer is connected to a server side via network;

Step 408, the client side computer sends a requirement for obtaining time information to the server side;

Step 409, public keys are exchanged between the server side and the client side computer;

Step 410, the server side generates a random number, encrypts the random number and current time of the server side with a public key of the USB Key to generate a first data packet, and sends the first data packet to the USB key via the client side computer;

Step 411, the USB Key decrypts the received first data packet with a private key, sets the time of server side in the first data packet as current time of the USB Key and counts time normally with the current time as benchmark time, so that the time source which trade relies on is calibrated;

Step 412, the current time of the USB Key and the random number in the first data packet are encrypted with a public key of the server side to generate a second data packet, and the second data packet is sent to the server side via the client side computer;

Step 413, the server side decrypts the second data packet with a private key, determines whether the random number in the received second data packet accords with the random number generated by the server side in the step 410, and is received for the first time, if so, go to step 415, otherwise go to step 414;

Step 414, error is prompted to the user via the client side computer;

Step 415, the server side calculates time difference according to the time in the second data packet and the current time of the server side when the sever side receives the second data packet, and stores the value of time difference at the server side, and according to the value of time difference, it calculates the time window by which the legitimacy of the time for the trade is determined.

Thereby, methods for calculating time window are as following:

1) setting the value of time difference calculated at a time as time window;

2) repeating the step above, to get more than one time difference values, and set the average value of those time different values as time window; and 3) performing mathematical operation on the time difference value with one or more coefficients, and setting the operation result as time window.

A clock module is set in the USB Key. When the benchmark time is set up, the clock module will count the time normally on the basis of the benchmark time. In the process of trading, replay attack can be avoided by setting up time window and adding time stamp on the trade information, which enhances the security of the trade. A random number generated by the server side as verification information with the second data packet is returned back to the server side, and the server side will determine whether the random number accords with the random number in the first data packet. So the second data packet is protected from being replaced. Further more, the second data packet with the random number cannot be reused by verifying whether the second data packet is received for the first time, and the replay attack is avoided.

Embodiment 2

Figure 2:
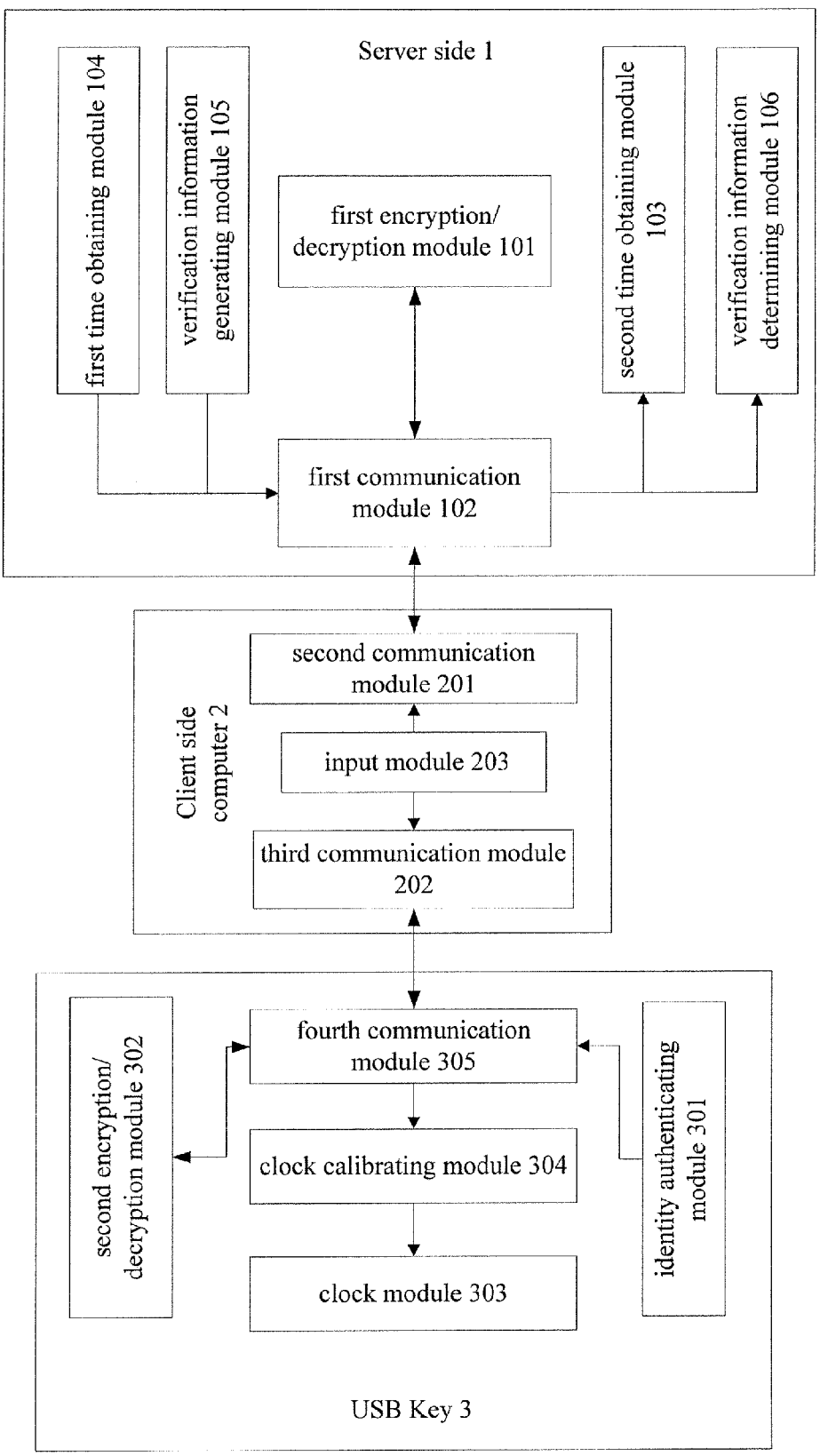
FIG. 2 is a structural diagram illustrating a system for time source calibration according to the second embodiment of the invention.

Referring to FIG. 2, a system of the above method for time source calibration wherein the system includes a server side 1, a client side computer 2, and a key device 3.

The server side 1 includes
a first time obtaining module 104 adapted to obtain current time of the server side;
a first communication module 102 adapted to send a first data packet including the current time of the server side to the client side computer and receive a second data packet from the client side computer;
a second time obtaining module 103 adapted to obtain the time of the key device 3 from the second data packet;
a verification information generating module 105 adapted to generate verification information, and the verification information is in the first data packet;
a verification information determining module 106 adapted to determine the validity of the verification information in the returned second data packet; and
a first encryption/decryption module 101 adapted to encrypt the first data packet sent from the first communication module or decrypt the second data packet received by the first communication module.

The client side computer 2 includes
a second communication module 201 adapted to implement data communication between the client side computer 2 and the server side 1;
a third communication module 202 adapted to implement data communication between the client side computer 2 and the key device 3; and
an input module 203 adapted to enter identity verification information by a user and send requirement of obtaining time to the server side.

The key device 3 includes
a fourth communication module 305 adapted to receive the first data packet forwarded by the client side computer 2 and send the second data packet including the calibrated current time of the key device 3 to the client side computer 2; a clock module 303 adapted to generate current time and count time by the key device 3;
a clock calibrating module 304 adapted to calibrate the time of the clock module 303 in the key device 3 according to the time in the first data packet;
a second encryption/decryption module 302 adapted to decrypt the first data packet received by the fourth communication module 305 or encrypt the second data packet sent from the fourth communication module 305; and
an identity authenticating module 301 adapted to permit the fourth communication module 305 to receive the first data packet after the identity verification information is authenticated.

The first communication module 102 and the second communication module 103 can be a telephone line interface, an Ethernet interface, or optical fiber.

The third communication module 202 and the fourth communication module 305 can be a USB interface, an eSATA interface, a SDIO interface, a PCMCIA interface, an infrared signal communication unit, a Bluetooth signal communication unit, a wireless USB signal communication unit, a contactless smart card communication unit, an optical signal communication unit, or a RF signal communication unit.

What is described above presents the invention of a method for time source calibration and a system thereof. The presently disclosed embodiments should be considered in all respects to be illustrative and not restrictive. The scope of the invention is indicated by the appended claims rather than the foregoing description, and all variations which come within the meaning and range of equivalents thereof are intended to be embraced therein.

What is claimed is:

1. A method for time source calibration, wherein said method comprises steps of sending a requirement for obtaining time by a client side computer to a server side; sending a first data packet including time and verification information generated by the server side to a key device via the client side computer; said time is the current time of the server side; calibrating the time of the key device via a clock calibrating module in the key device with the obtained current time of the server side as benchmark time and counting time normally by the key device via a clock module in the key device; sending a second data packet including calibrated current time of the key device and the verification information by the key device via a communication module of the key device to the server side via the client side computer; and obtaining the current time of the key device in the second data packet by the server side after the verification information in the second data packet is verified to be valid by the server side, wherein in the step that the verification information in the second data packet is verified to be valid by the server side, the verification information is deemed as valid when the verification information in the second data packet accords with the verification information generated by the server side.

2. The method for time source calibration of the claim 1, wherein the verification information is is received for the first time.

3. The method for time source calibration of the claim 1, wherein a step before sending a requirement for obtaining time by the client side computer to the server side includes authenticating identity of a user by the key device.

4. The method for time source calibration of the claim 1, wherein a step after sending a requirement for obtaining time by the client side computer to the server side includes exchanging public keys between the server side and the client side computer.

5. The method for time source calibration of the claim 1, wherein the verification information is a random number generated by the server side.

6. The method for time source calibration of the claim 4, wherein the first data packet and the second data packet are sent as cipher text, the first data packet is encrypted with the public key of the key device; and the second data packet is encrypted with the public key of the server side.

7. The method for time source calibration of the claim 3, wherein the authenticating identity includes
1) verifying whether the PIN code entered by the user is legitimate;
2) verifying whether the biological features of the user is legitimate;

3) verifying whether the key device provided by the user contains legitimate data;
4) verifying whether the key device provided by the user contains legitimate hardware serial number; and/or
5) sending data to the key device for operation and verifying whether the operation result is legitimate.

* * * * *